(12) United States Patent
Polushin et al.

(10) Patent No.: US 6,282,887 B1
(45) Date of Patent: Sep. 4, 2001

(54) BELLOWS UNITS FOR A CHAMBER OF A LIQUID-PROPELLANT ROCKET ENGINE WITH AFTERBURNING

(75) Inventors: Valentin Georgievich Polushin, Moskovskaya; Mikhail Ivanovich Osokin, Moscow; Inna Alexandrovna Kolosova, Moskovskaya; Khachatur Begoevich Sarafaslanjan, Moskovskaya; Ivan Denisovich Postnikov, Moskovskaya, all of (RU)

(73) Assignee: Otkrytoe Aktsionernoe Obschestvo "Nauchno Proizwodstvennoe Obiedinenie "Energomash"Imeni Akademika V.P. Glusho", Moscow (RU)

( * ) Notice: Subject to any disclaimer, the term of this patent is extended or adjusted under 35 U.S.C. 154(b) by 0 days.

(21) Appl. No.: 09/383,474

(22) Filed: Aug. 26, 1999

(30) Foreign Application Priority Data

Jan. 21, 1999 (RU) .................................................. 99101159

(51) Int. Cl.[7] ................................. F02K 9/42; F02K 9/84
(52) U.S. Cl. .................................. 60/257; 60/232; 60/266; 285/226; 239/265.35; 239/127.3
(58) Field of Search .............................. 60/230, 232, 257, 60/266, 271; 239/265.17, 265.33, 265.35, 127.3; 244/12.4, 12.5, 230; 285/226, 299, 41

(56) References Cited

U.S. PATENT DOCUMENTS

| | | | |
|---|---|---|---|
| 3,090,198 | * | 5/1963 | Zeisloft ............................ 239/265.35 |
| 3,140,584 | * | 7/1964 | Ritchey et al. ......................... 60/232 |
| 3,179,447 | * | 4/1965 | Parr et al. ........................ 239/265.35 |
| 3,184,917 | * | 5/1965 | Caouette et al. ................. 239/265.35 |
| 3,811,713 | * | 5/1974 | Barrett et al. ........................... 60/232 |
| 3,915,482 | * | 10/1975 | Fletcher et al. ........................ 285/226 |
| 4,165,107 | * | 8/1979 | Affa et al. .............................. 285/226 |
| 4,526,409 | * | 7/1985 | Schaefer ................................ 285/114 |
| 5,090,746 | * | 2/1992 | Holzhausen ........................... 285/226 |
| 5,437,479 | * | 8/1995 | Hartling et al. ....................... 285/226 |

FOREIGN PATENT DOCUMENTS 1008156   10/1965   (GB) .

OTHER PUBLICATIONS

Partial Translation of article "Liquid–Propellant Rocket Engine Design and Engineering" Edited by Prof. G.G. Gakhun, Moscow, "Mashinostroyeniye" 1989, pp. 355, 374 and 375.

* cited by examiner

Primary Examiner—Ted Kim
(74) Attorney, Agent, or Firm—Kenyon & Kenyon

(57) ABSTRACT

A device comprises a bellows with protective rings arranged between corrugations of the bellows. Support rings are connected in a sealed manner to a gas line and a combustion chamber. A gimbal ring is positioned outside the bellows and via hinges is connected to structural brackets with support rings. A shield is mounted inside the bellows, the shield consisting of two cylindrical envelopes telescopically inserted one in another with a gap. The cylindrical envelopes are fixed in cantilever to support rings, forming a chamber which via channels for feeding a cooling working medium made in the support rings is connected to a main line for feeding the cooling working medium, and via the gap between the envelopes—to the cavity of the bellows unit. A housing is arranged outside the protective rings and adjoining them, and is made in the form of a metallic cylindrical helix, the ends of which are connected to the support rings (FIG. 2).

25 Claims, 2 Drawing Sheets

BELLOWS UNITS FOR A CHAMBER OF A LIQUID-PROPELLANT ROCKET ENGINE WITH AFTERBURNING

FIELD OF THE INVENTION

The invention relates to the field of rocket manufacturing, in particular to bellows units and a rocking unit of a combustion chamber of a liquid-propellant rocket engine (LPE) with afterburning, and may be used in pipeline systems operating under high-temperature and high-pressure conditions.

BACKGROUND OF THE INVENTION

Both gas dynamic and mechanical methods and means for acting on the gas stream flowing out of the nozzle of a rocket engine in order to create control moments causing the rocket to turn in three planes (pitch, yaw and roll) are known.

The present invention relates to mechanical means ensuring the generation of control moments influencing the rocket during its flight.

In particular, the following methods and means relate to mechanical methods and means for controlling the flight of a rocket by acting on the gas stream.

An engine mounted with the possibility of its rocking in two mutually perpendicular planes is known ("Liquid-Propellant Rocket Engine Construction and Design" edited by Prof. G. G. Gakhun, Moscow, Mashinostroenie, 1989, p. 355, FIG. 14.3).

Limitations of this technical solution include first of all the placement of a hinge between the structural frame and the engine, and, accordingly, the necessity to ensure a turn of the whole engine when the gas stream is acted on. This increases the weight of the control actuators and makes flight control more difficult in the rocket stabilization mode. Furthermore, it not possible to reduce the load on the hinge by the thrust force, since the hinge is mounted between the frame and the engine.

Mounting the chamber with the possibility of its rocking in a gimbal is known ("Liquid-Propellant Rocket Engine Construction and Design " edited by Prof. G. G. Gakhun, Moscow, Mashinostroenie, 1989, p. 374, FIG. 14.10).

Disadvantages of this known technical solution include the substantial weight of the gimbal and the bearing unit, since they take up the whole thrust of the engine chamber, and it is not possible to reduce the load on these units.

Mounting the chamber with the possibility of its rocking in one plane on a bearing unit relative to an immovably fixed tube through which one of the propellant components is fed is known (GB, A, 1008156).

Limitations of this technical solution include the necessity for accurate assembly and adjustment of the position of the bearing unit supports in order to achieve the required coaxiality and uniformity of the transfer of thrust to the structural frame, and also the possibility for the chamber to only turn in one plane, which limits its use in single-chamber engines.

A rocking unit for the chamber of a liquid-propellant rocket engine with afterburning is known, which comprises a chamber, mounted on a gimbal, and a bellows unit ("Liquid-Propellant Rocket Engine Construction and Design" edited by Prof. G. G. Gakhun, Moscow, Mashinostroenie, 1989, p. 375, FIG. 14.11).

The known technical solution ensures rocking of the chamber in two mutually perpendicular planes. At the same time, this technical solution, in the form in which it is presented in the above publication does not have means ensuring the serviceability of the bellows unit in a medium of oxidizing, high-temperature, high-pressure gas, means ensuring a reduction of the load on the bearing supports of the gimbal, and also means ensuring stability of the bellows envelope when it is bent to a substantial angle, for example, within the range of 10–12 degrees.

DISCLOSURE OF THE INVENTION

Consequently, an object of the invention is to develop such a bellows unit for a combustion chamber of a liquid-propellant rocket engine with afterburning, which would be serviceable in a medium of high-temperature, high-pressure gas.

Another object of the invention is to develop such a bellows unit for a combustion chamber, mounted in a gimbal, of a liquid-propellant rocket engine with afterburning, which would ensure a reduction of the load on the bearing supports of the gimbal.

One more object of the invention is to develop such a bellows unit for a rocking unit of the combustion chamber of a liquid-propellant rocket engine with afterburning, which would ensure stability of the bellows envelope when it is bent to a substantial angle.

Finally, the last object of the invention is to develop a rocking unit of the combustion chamber of a liquid-propellant rocket engine with afterburning, in which such a bellows unit could be used.

These objects in accordance with one aspect of the invention are achieved by means of a bellows unit for a combustion chamber of a liquid-propellant rocket engine with afterburning, the unit comprising a bellows having two end faces and a corrugated envelope positioned at its periphery along a longitudinal axis of the aforesaid bellows, an internal shield of the bellows that has an internal cavity of the shield which is limited by a first envelope of the shield and a second envelope of the shield, each of the aforesaid shield envelopes being a body of rotation positioned along the longitudinal axis of the bellows, adjoining end faces of the aforesaid first and second shield envelopes being telescopically installed one in another with a gap between them, a bellows cooling chamber positioned between the aforesaid internal shield and the aforesaid corrugated envelope, the bellows cooling chamber communicating via the aforesaid gap with the aforesaid internal cavity of the shield, a first support ring and a second support ring which are positioned coaxially with the aforesaid bellows at both end faces thereof and fixed in cantilever to corresponding end faces of the first and second shield envelopes, channels for feeding a cooling working medium which are made in the aforesaid rings and serve for feeding the cooling working medium into the cooling chamber of the bellows.

In order to ensure a reduction of the load on the bearing supports of the gimbal, the average diameter of the bellows is selected from the following relationship:

$$D_c \geq 1.13 \sqrt{\frac{R}{P}}, \text{ where}$$

$D_c$ is the average diameter of the bellows,
R is the engine chamber thrust force,
P is the turbine gas pressure.

In order to enhance cooling of the bellows, an adjoining end face of the aforesaid first shield envelope is made in the form of a nipple with a spherical end.

In order to enhance the efficiency of the engine, one of the propellant components is used as the cooling working medium.

In order to enhance the strength of the construction, protective structural rings of the bellows are positioned in depressions of the outer corrugations of the aforesaid corrugated envelope of the bellows.

These objects according to the following aspect of the invention are achieved by means of a bellows unit for a combustion chamber of a liquid-propellant rocket engine with afterburning mounted in a gimbal, the unit comprising a bellows having two end faces and a corrugated envelope positioned at its periphery along a longitudinal axis of the aforesaid bellows, an internal shield of the bellows that has an internal cavity of the shield which is limited by a first envelope of the shield and a second envelope of the shield, each of the aforesaid shield envelopes being a body of rotation positioned along the longitudinal axis of the bellows, adjoining end faces of the aforesaid first and second shield envelopes being telescopically installed one in another with a gap between them, a bellows cooling chamber positioned between the aforesaid internal shield and the aforesaid corrugated envelope, the bellows cooling chamber communicating via the aforesaid gap to the aforesaid internal cavity of the shield, a first support ring and a second support ring which are positioned coaxially with the aforesaid bellows at both end faces thereof and fixed in cantilever to corresponding end faces of the first and second shield envelopes, channels for feeding a cooling working medium which are made in the aforesaid rings and serve for feeding the cooling working medium into the cooling chamber of the bellows, wherein the average diameter of the bellows is selected from the following relationship:

$$D_c \geq 1.13 \sqrt{\frac{R}{P}}, \text{ where}$$

$D_c$ is the average diameter of the bellows,
R is the engine chamber thrust force,
P is the turbine gas pressure.

These objects in accordance with one more aspect of the invention are achieved by means of a bellows unit for a rocking unit of a combustion chamber of a liquid-propellant rocket engine with afterburning, the unit comprising a bellows having two end faces and a corrugated envelope positioned at its periphery along a longitudinal axis of the aforesaid bellows, protective structural rings of the bellows that are positioned in depressions of outer corrugations of the aforesaid corrugated envelope, an internal shield of the bellows having an internal cavity of the shield, the cavity being limited by a first shield envelope and a second shield envelope, each of the aforesaid shield envelopes is a body of rotation positioned along the longitudinal axis of the bellows, adjoining end faces of the aforesaid first and second shield envelopes being telescopically installed one in another with a gap between them, a bellows cooling chamber positioned between the aforesaid internal shield and the aforesaid corrugated envelope, the bellows cooling chamber communicating via the aforesaid gap to the aforesaid internal cavity of the shield, a first support ring and a second support ring which are positioned coaxially with the aforesaid bellows at both end faces thereof and fixed in cantilever to corresponding end faces of the first and second shield envelopes, channels for feeding a cooling working medium which are made in the aforesaid rings and serve for feeding the cooling working medium into the cooling chamber of the bellows, a housing of the bellows mounted with interference outside the aforesaid protective structural rings of the bellows and made in the form of a metallic cylindrical helix, the ends of which are connected to the aforesaid support rings.

It is preferable that the center of the sphere of a nipple with a spherical end be positioned on the axis of rocking of the chamber of the liquid-propellant rocket engine.

Moreover, in order to ensure constant cooling of the bellows when the rocking unit turns, it is desirable that the gap between the envelopes of the internal shield, ensuring the necessary consumption of the cooling working medium, remains open.

In order to enhance the strength of the construction, it is advisable that the aforesaid housing of the bellows be made multilayered, and that each layer be made from a metallic cylindrical helix.

It is even more preferable that adjoining turns of the helix of the multilayered housing be wound in opposite directions.

These objects in accordance with the last aspect of the invention are achieved by means of a rocking unit of a combustion chamber of a liquid-propellant rocket engine with afterburning, comprising a gas line, a combustion chamber having a longitudinal axis and being positioned downstream of the aforesaid gas line in respect of the gas flow, a gimbal supporting the aforesaid combustion chamber, a bellows unit mounted coaxially with the aforesaid combustion chamber between it and the aforesaid gas line, and having a bellows with two end faces and a corrugated envelope positioned at the periphery of the aforesaid bellows along its longitudinal axis, protective structural rings of the bellows, positioned in depressions in the outer corrugations of the aforesaid corrugated envelope, an internal shield of the bellows having an internal cavity of the shield, limited by a first shield envelope and a second shield envelope, each of the aforesaid shield envelopes being a body of rotation positioned along the longitudinal axis of the bellows, adjoining end faces of the aforesaid first and second shield envelopes are telescopically mounted one in the other with a gap therebetween, a cooling chamber of the bellows positioned between the aforesaid internal shield and the aforesaid corrugated envelope, the cooling chamber of the bellows communicating via the aforesaid gap with the aforesaid internal cavity of the shield, a first support ring and a second support ring positioned coaxially with the aforesaid bellows at both end faces thereof and fixed in cantilever to corresponding end faces of the first and second shield envelopes, the first support ring serving to provide a sealed connection between the bellows unit and the aforesaid gas line, and the second support ring serving to provide a sealed connection between the bellows unit and the aforesaid combustion chamber, channels for feeding a cooling working medium that are made in the aforesaid support rings and serve to feed a cooling working medium into the cooling chamber of the bellows from a main line for feeding the cooling working medium, a housing of the bellows that is mounted with interference outside the aforesaid protective structural rings of the bellows and is made in the form of a metallic cylindrical helix, ends of which are connected to the aforesaid support rings, a gimbal ring of the aforesaid gimbal that envelops the aforesaid bellows unit and is hinge connected through structural brackets to the first support ring and to the second support ring, respectively.

BRIEF DESCRIPTION OF THE DRAWINGS

The invention will be better understood from a comprehensive description thereof with references to the accompanying drawings, wherein.

Figure 2:
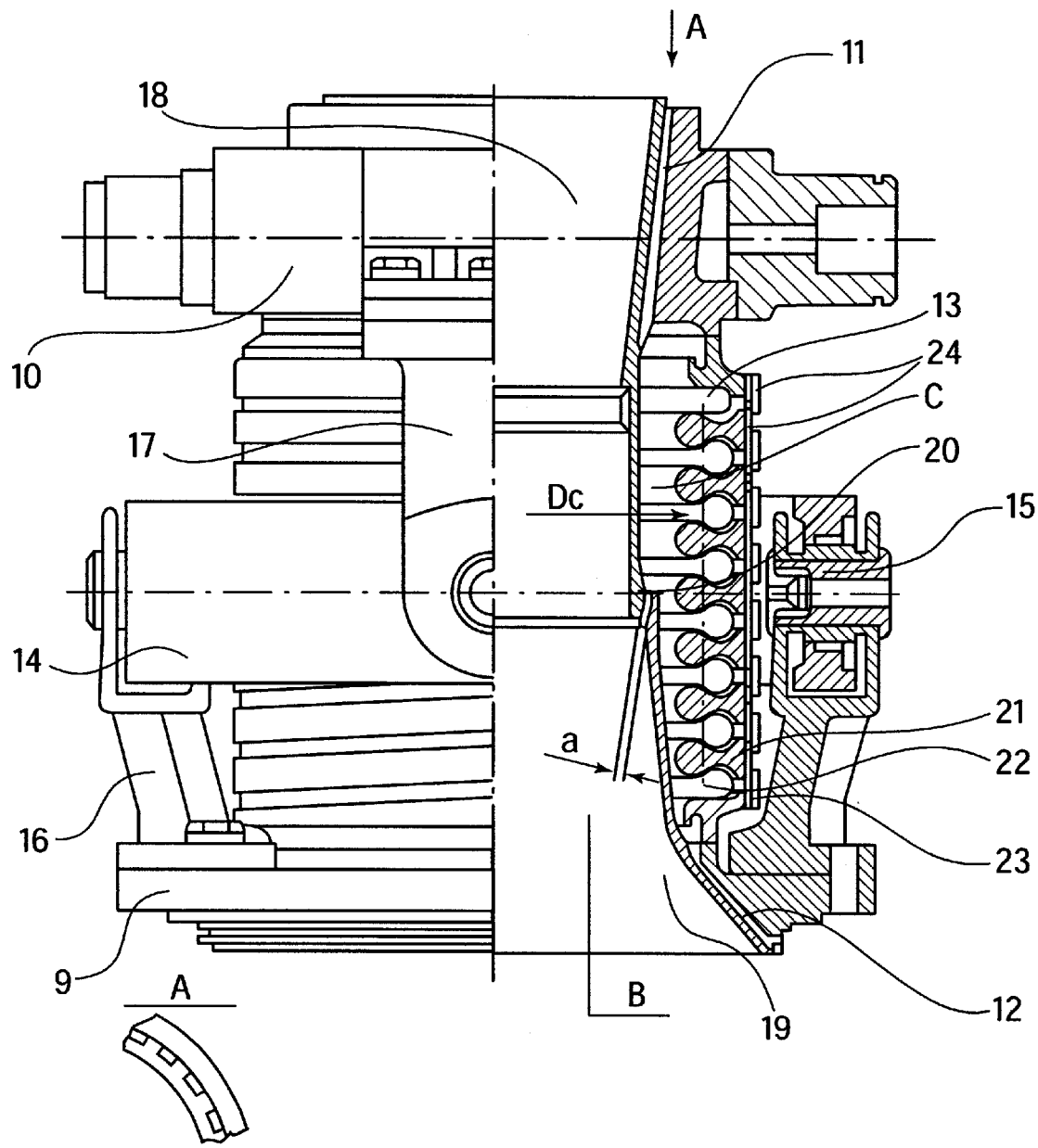
FIG. 2 shows the construction of a rocking unit.

The view A in FIG. 2 clarifies the location of channels for feeding the cooling working medium.

BEST METHOD OF CARRYING OUT THE INVENTION

It should be understood that the best embodiment, which does not restrict the invention, is herewith described.

Figure 1:
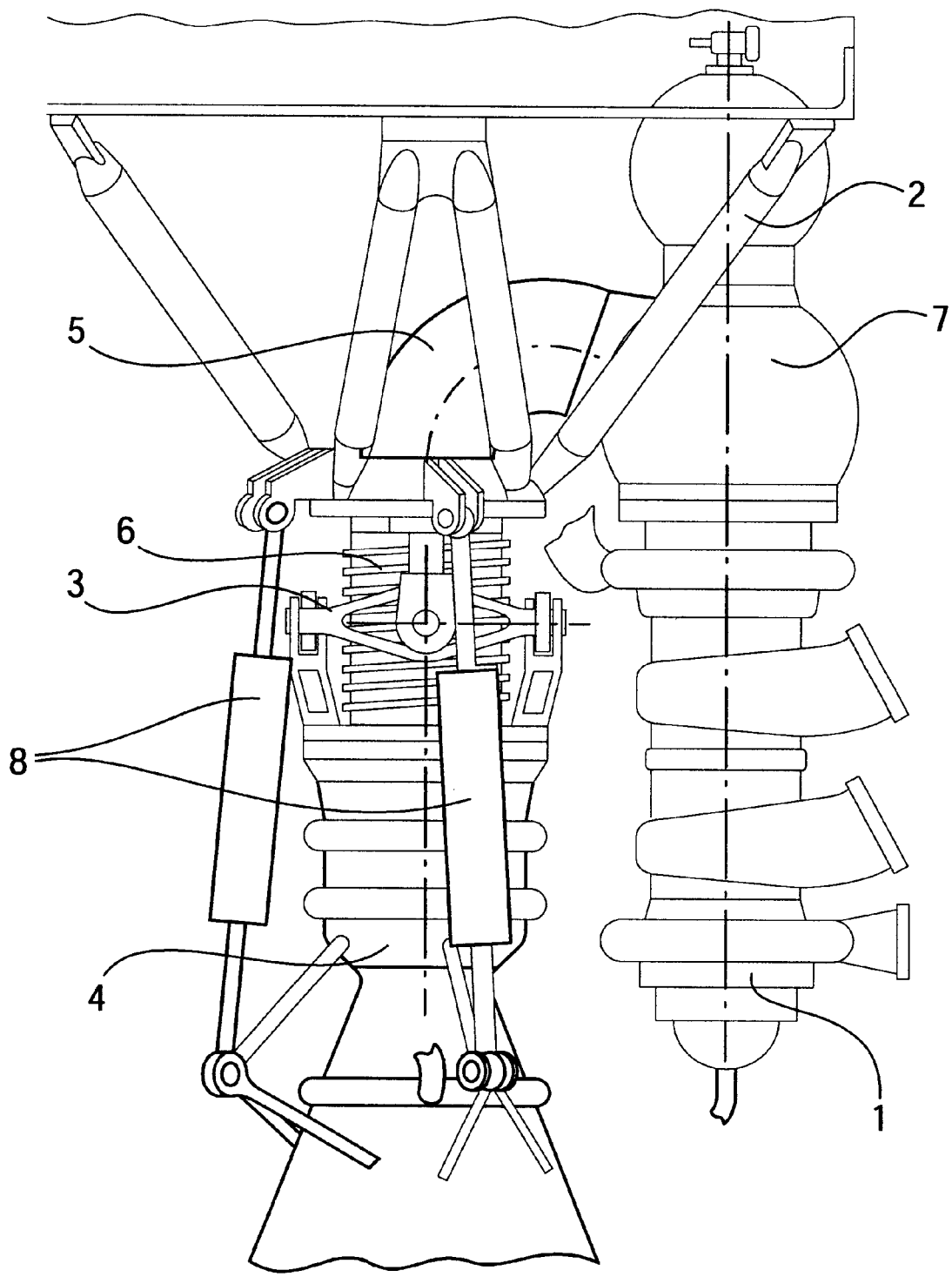
FIG. 1 shows a rocking unit mounted in a gas line between the outlet from a turbine and the inlet into a mixing head of a combustion chamber.

A turbopump assembly 1 (FIG. 1) is immovably mounted on a frame 2 on which an engine combustion chamber 4 is mounted using a gimbal 3.

A gas line 5 is connected at one end to a bellows unit 6, coaxially connected to the combustion chamber 4, and at the other end is connected to an outlet from a turbine 7.

Control actuators 8 are mounted in two mutually perpendicular planes between the structural frame 2 and the chamber 4.

The mounting of a bellows unit 6 coaxially connected to the combustion chamber 4 in a high pressure turbine gas line makes it possible to reduce the load on the gimbal 3 of the combustion chamber 4 during the main operation mode of the engine by selecting the average bellows diameter in such a way that the elongating forces of the turbine gas internal pressure would correspond to the compressing thrust force of the combustion chamber in accordance with the relationship:

$$D_c \geq 1.13 \sqrt{\frac{R}{P}}, \quad (1)$$

where $D_c$ is the average diameter of the bellows (FIG. 2), P is the pressure of the turbine gas, R is the engine chamber thrust force.

A rocking unit (FIG. 2) comprises support rings 9 and 10 that are respectively connected in an air-tight manner to the gas line 5 (outlet from the turbine) and the combustion chamber 4 (FIG. 1), in which channels 11 and 12 for feeding the cooling working medium are located (shown in view A, FIG. 2).

The composition of the bellows unit 6 includes the bellows 13 that is positioned inside a gimbal ring 14 of the gimbal 3. The gimbal ring 14 through hinges 15 (forming two axes of rotation) is connected by structural brackets 16 and 17 to support rings 9 and 10. There are two envelopes 18 and 19 inside the bellows 13, each of the envelopes being a body of rotation and secured in cantilever to respectively one of the aforesaid support rings, wherein an end of the envelope 18, adjoining a corresponding end of the envelope 19, is made in the form of a nipple 20 with a spherical end and is mounted inside the envelope 19 with a gap α. The center of the sphere of the nipple 20 with the spherical end is located on the rocking axis of the chamber. The magnitude of the gap a is chosen so as to ensure the flow rate of the cooling working medium (one of the fuel components, the oxidizer, for example, being used as such a cooling medium), necessary for reliable cooling of the bellows 13. The bellows unit 6 is made multilayered and provided with protective rings 21, inserted between corrugations 22 of the corrugated envelope of the bellows 13. A housing 23 is mounted outside the protective rings 21 and proximate thereto. The housing is made of one or several layers of cylindrical helixes 24, connected by their ends to the support rings 9 and 10 of the bellows unit 6. In the construction of the bellows unit 6 with a housing consisting of several layers of helixes, the adjacent layers adjoin each other and their turns are wound in opposite directions.

The device operates in the following manner. As in the known device, during engine operation turbine gas is fed through the gas line 5 and bellows unit 6 to the combustion chamber 4, in which it is after-burned and flows out of the nozzle (not shown), generating a thrust force. However, if the average bellows diameter is selected according to the relationship (1), the thrust force balances the internal forces of gas pressure inside the bellows and the combustion chamber 4 turns out to be freely suspended in space.

In the claimed device, the cooling working medium (in particular, the oxidizer), prior to the turbine gas entering the cavity B of the bellows 13, through the channels 11 and 12 for feeding the cooling working medium, enters the ring cavity C (FIG. 2) formed by the corrugated envelope of the bellows 13 and the envelopes 18 and 19 of the protective shield. This cooling working medium, cooling the bellows 13 through the gap α enters the internal cavity B of the bellows 13 (FIG. 2). The gap between the envelopes of the internal shield is chosen from the condition of ensuring the necessary flow rate of the medium.

The use of a unit for rocking the bellows cooling system in this construction makes it possible to maintain its strength properties and thus enhance the reliability of operation of this unit.

The mounting of a metallic structural housing in the form of a metallic cylindrical helix outside the protective rings 21 of the bellows 13 increases the strength properties of the bellows unit 6 and at the same time limits the spontaneous bending of the bellows unit 6 when the engine chamber turns to relatively large angles (10–12 degrees) and thus increases its stability.

The use of the proposed rocking unit makes it possible to lighten and simplify the system of control actuators and their power supply, ensure control of the thrust vector of the rocket over a large range of control forces when the combustion chamber turns to the required (from the point of view of the control system) angles.

The proposed rocking unit of the chamber of a liquid-propellant rocket engine with afterburning may be most successfully used in average and high thrust engines operating under high-temperature (t=400–800° C.) and high-pressure (P to 600 kgf/cm²) conditions.

What is claimed is:

1. A bellows unit for a combustion chamber of a liquid-propellant rocket engine with afterburning, comprising:

a bellows having two end faces and a corrugated envelope positioned at a periphery of said bellows along a longitudinal axis thereof, said bellows adapted to interface with said liquid propellant rocket engine, an internal shield of said bellows, said shield having an internal cavity, said cavity being limited by a first envelope of said shield and by a second envelope of said shield, each of said shield envelopes being a body of rotation positioned along said longitudinal axis of said bellows, adjoining end faces of said first and second shield envelopes being telescopically installed one in another with a gap therebetween, a bellows cooling chamber positioned between said internal shield and said corrugated envelope, said bellows cooling chamber communicating via said gap with said internal cavity of said shield, a first support ring and a second support ring, which are positioned coaxially with said bellows at both end faces thereof and fixed in cantilever to corresponding end faces of said first and said second shield envelopes, channels for feeding a cooling working medium, which are made in said rings and are adapted to feed said cooling working medium into said cooling chamber of said bellows, whereby workability of said bellows unit in a high-temperature, high-pressure gas medium is ensured.

2. A bellows unit according to claim 1, wherein an average diameter of said bellows is selected from the following relationship:

$$D_c \geq 1.13 \sqrt{\frac{R}{P}}, \text{ where}$$

$D_c$ is the average diameter of the bellows,

R is the engine chamber thrust force,

P is the turbine gas pressure.

3. A bellows unit according to claim 1, wherein said adjoining end face of said first shield envelope is made in the form of a nipple with a spherical end.

4. A bellows unit according to claim 1, wherein at least one propellant component is used as the cooling working medium.

5. A bellows unit according to claim 1, wherein protective structural rings of said bellows are positioned in outer depressions in an outer corrugation of said corrugated envelope.

6. A bellows unit for a combustion chamber of a liquid-propellant rocket engine with afterburning, said combustion chamber being mounted in a gimbal, comprising:

a bellows having two end faces and a corrugated envelope positioned at a periphery of said bellows along a longitudinal axis thereof, said bellows adapted to interface with said liquid propellant rocket engine, an internal shield of said bellows, said shield having an internal cavity thereof, which cavity is limited by a first envelope of said shield and by a second envelope of said shield, each of said shield envelopes being a body of rotation positioned along said longitudinal axis of said bellows, adjoining end faces of said first and second shield envelopes being telescopically installed one in another with a gap therebetween, a bellows cooling chamber positioned between said internal shield and said corrugated envelope, said bellows cooling chamber communicating via said gap to said internal cavity of said shield, a first support ring and a second support ring, which are positioned coaxially with said bellows at both end faces thereof and fixed in cantilever to corresponding end faces of said first and said second shield envelopes, channels for feeding a cooling working medium, which are made in said rings and are adapted to feed said cooling working medium into said cooling chamber of said bellows, wherein an average diameter of said bellows is selected from the following relationship:

$$D_c \geq 1.13 \sqrt{\frac{R}{P}}, \text{ where}$$

$D_c$ is the average diameter of the bellows,

R is the engine chamber thrust force,

P is the turbine gas pressure, whereby the workability of said bellows unit in a high-temperature, high-pressure gas medium and a reduction of the load on support bearings of said gimbal are ensured.

7. A bellows unit according to claim 6, wherein said adjoining end face of said first shield envelope is made in the form of a nipple with a spherical end.

8. A bellows unit according to claim 6, wherein at least one propellant component is used as the cooling working medium.

9. A bellows unit according to claim 6, wherein protective structural rings of said bellows are positioned in outer depressions in an outer corrugation of said corrugated envelope.

10. A bellows unit for a rocking unit of a combustion chamber of a liquid-propellant rocket engine with afterburning, comprising:

a bellows having two end faces and a corrugated envelope positioned at a periphery of said bellows along a longitudinal axis thereof, protective structural rings of said bellows that are positioned in depressions of outer corrugations of said corrugated envelope, an internal shield of said bellows, having an internal cavity of said shield, said cavity being limited by a first shield envelope and a second shield envelope, each of said shield envelopes being a body of rotation positioned along said longitudinal axis of said bellows, adjoining end faces of said first and said second shield envelopes being telescopically installed one in another with a gap therebetween, a bellows cooling chamber positioned between said internal shield and said corrugated envelope, said bellows cooling chamber communicating via said gap to said internal cavity of said shield, a first support ring and a second support ring, which are positioned coaxially with said bellows at both end faces thereof and fixed in cantilever to corresponding end faces of said first and said second shield envelopes, channels for feeding a cooling working medium, which are made in said rings and are adapted to feed said cooling working medium into said cooling chamber of said bellows, a housing of said bellows, mounted with interference outside said protective structural rings of said bellows and made in the form of a metallic cylindrical helix, ends of which are connected to said support rings, whereby the workability of said bellows unit in a medium of high-temperature, high-pressure gas, enhancement of strength properties of said bellows unit and limitation of spontaneous bending of said bellows unit when said combustion chamber of said engine is turned, are ensured.

11. A bellows unit according to claim 10, wherein an average diameter of said bellows is selected from the following relationship:

$$D_c \geq 1.13 \sqrt{\frac{R}{P}}, \text{ where}$$

$D_c$ is the average diameter of the bellows,

R is the engine chamber thrust force,

P is the turbine gas pressure.

12. A bellows unit according to claim 10, wherein said adjoining end face of said first shield envelope is made in the form of a nipple with a spherical end.

13. A bellows unit according to claim 12, wherein a center of a sphere of said nipple with a spherical end is positioned on an axis of rocking of said chamber of said liquid-propellant rocket engine.

14. A bellows unit according to claim 10, wherein in order to ensure constant cooling of said bellows when said rocking unit turns, said gap between said envelopes of said internal shield, ensuring necessary flow rate of said cooling working medium, remains open.

15. A bellows unit according to claim 10, wherein said housing of said bellows is made multilayered, and each layer is made from a metallic cylindrical helix.

16. A bellows unit according to claim 15, wherein adjoining turns of said helix of said multilayered housing are wound in opposite directions.

17. A bellows unit according to claim 10, wherein one of said propellant components is used as said cooling working medium.

18. A rocking unit of a combustion chamber of a liquid-propellant rocket engine with afterburning, comprising:
- a gas line,
- a combustion chamber having a longitudinal axis and being positioned downstream of said gas line in respect of said gas flow,
- a gimbal supporting said combustion chamber, a bellows unit mounted coaxially with said combustion chamber between it and said gas line, and having a bellows with two end faces and a corrugated envelope positioned at a periphery of said bellows along its longitudinal axis,
- protective structural rings of said bellows, positioned in depressions in said outer corrugations of said corrugated envelope,
- an internal shield of said bellows, having an internal cavity of said shield, said cavity being limited by a first shield envelope and by a second shield envelope, each of said shield envelopes being a body of rotation positioned along said longitudinal axis of said bellows, adjoining end faces of said first and second shield envelopes being telescopically installed one in the other with a gap therebetween,
- a cooling chamber of said bellows, positioned between said internal shield and said corrugated envelope, said cooling chamber of said bellows communicating via said gap with said internal cavity of said shield,
- a first support ring and a second support ring positioned coaxially with said bellows at both end faces thereof and fixed in cantilever to corresponding end faces of said first and second shield envelopes, said first support ring serving to provide a sealed connection between said bellows unit and said gas line, and said second support ring serving to provide a sealed connection between said bellows unit and said combustion chamber,
- channels for feeding a cooling working medium, that are made in said support rings and are adapted to feed said cooling working medium into said cooling chamber of said bellows from a main line for feeding said cooling working medium,
- a housing of said bellows, that is mounted with interference outside said protective structural rings of said bellows and is made in the form of a metallic cylindrical helix, ends of which being connected to said support rings,
- a gimbal ring of said gimbal, that envelops said bellows unit and is hinge connected through structural brackets to said first support ring and to said second support ring, respectively.

19. A rocking unit according to claim 18, wherein an average diameter of said bellows is selected from the following relationship:

$$D_c \geq 1.13 \sqrt{\frac{R}{P}}, \text{ where}$$

$D_c$ is the average diameter of the bellows,

R is the engine chamber thrust force,

P is the turbine gas pressure.

20. A rocking unit according to claim 18, wherein said adjoining end face of said first shield envelope is made in the form of a nipple with a spherical end.

21. A rocking unit according to claim 20, wherein a center of a sphere of said nipple with a spherical end is positioned on a rocking axis of said chamber of said liquid-propellant rocket engine.

22. A rocking unit according to claim 18, wherein in order to ensure constant cooling of said bellows when said rocking unit turns, said gap between said envelopes of said internal shield, ensuring necessary flow rate of said cooling working medium, remains open.

23. A rocking unit according to claim 18, wherein said housing is made multilayered, and each layer is made from a metallic cylindrical helix.

24. A rocking unit according to claim 23, wherein adjoining turns of said helix of said multilayered housing are wound in opposite directions.

25. A rocking unit according to claim 18, wherein at least one propellant component is used as said cooling working medium.

* * * * *